(12) United States Patent
Adomeit et al.

(10) Patent No.: US 6,755,091 B2
(45) Date of Patent: Jun. 29, 2004

(54) TRANSMISSION AND METHOD FOR CONTROLLING A TRANSMISSION FOR A MOTOR VEHICLE

(75) Inventors: Carsten Adomeit, Hannover (DE); Rainer Hofmann, Braunschweig (DE)

(73) Assignee: Volkswagen AG, Wolfsburg (DE)

(*) Notice: Subject to any disclaimer, the term of this patent is extended or adjusted under 35 U.S.C. 154(b) by 0 days.

(21) Appl. No.: 10/241,553

(22) Filed: Sep. 11, 2002

(65) Prior Publication Data

US 2003/0051567 A1 Mar. 20, 2003

(30) Foreign Application Priority Data

Sep. 18, 2001 (DE) .......................... 101 45 918

(51) Int. Cl.[7] .................... F16H 59/00; F16H 61/04
(52) U.S. Cl. ........................... 74/335; 477/143
(58) Field of Search ................. 74/325, 329, 331, 74/335; 477/71, 143

(56) References Cited

U.S. PATENT DOCUMENTS 4,676,115 A * 6/1987 Morscheck et al. .......... 74/339
5,351,569 A * 10/1994 Trick et al. .................. 74/329
5,603,242 A * 2/1997 Krieger ....................... 74/335
6,364,809 B1 * 4/2002 Cherry ........................ 477/86
6,604,438 B2 * 8/2003 Ruhle et al. ................. 74/335
2003/0051577 A1 * 3/2003 Hirt ......................... 74/331 X

FOREIGN PATENT DOCUMENTS

DE  199 12 817 A1  8/2000
GB  2069635  *  8/1981

* cited by examiner

Primary Examiner—Roger Pang

(57) ABSTRACT

A transmission, in particular an automated shift transmission, includes a plurality of selectable and deselectable gear stages for implementing gear changes. The selection and deselection of the gear stages is achieved with the aid of coupling units, in particular with the aid of engageable and disengageable sliding collars. The coupling units are activatable via respective shift rails and respective actuators. The shifting times are reduced and a compact construction of the transmission is achieved by virtue of the fact that a plurality of gear stages is assigned to at least two different shift rails in such a way that respective successive gear stages are assigned to respective different shift rails. As a result, the respective shift rails can be activated at least partially simultaneously in the case of a sequential gear change. A method for controlling a transmission is also provided.

15 Claims, 4 Drawing Sheets

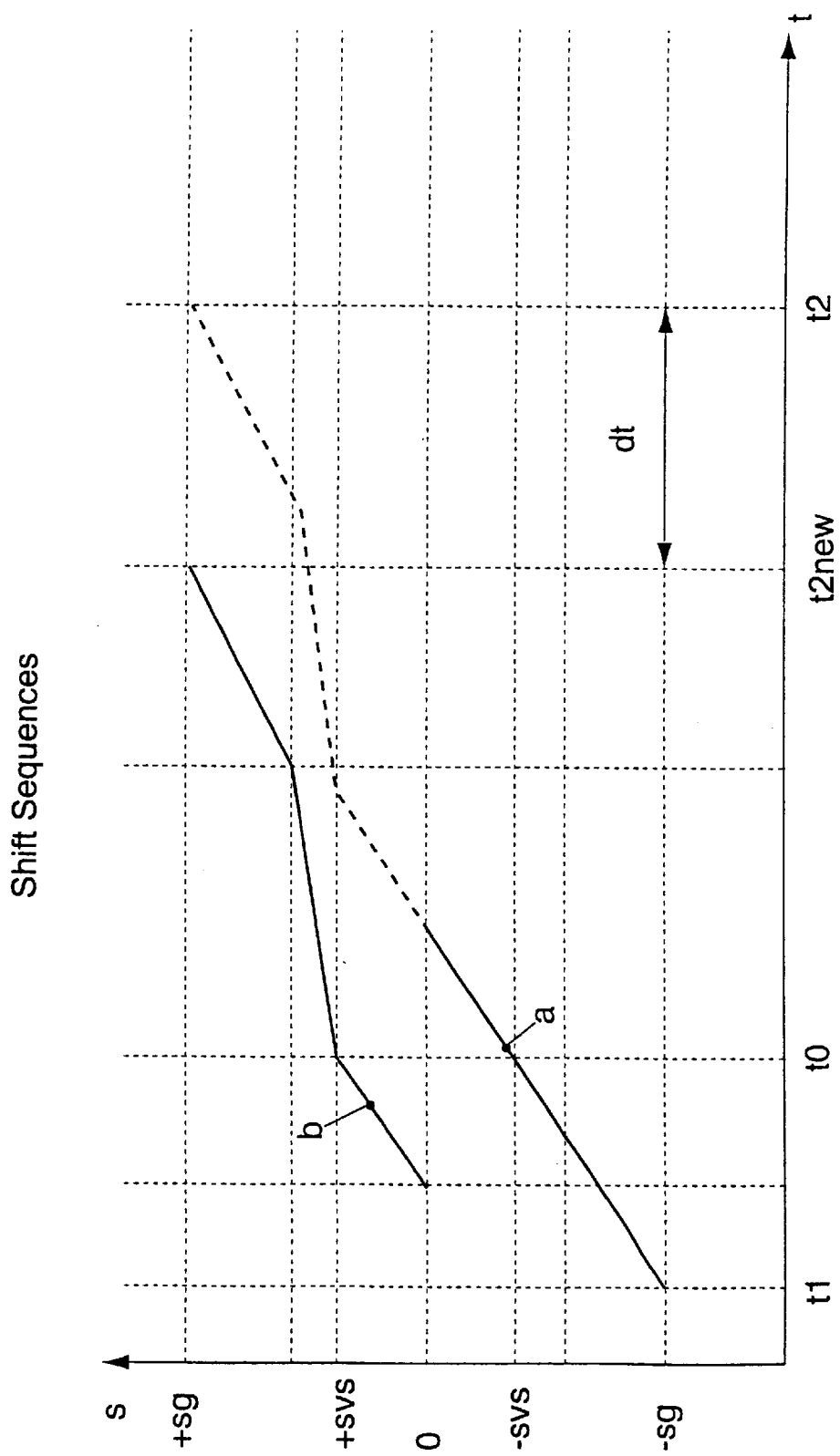

TRANSMISSION AND METHOD FOR CONTROLLING A TRANSMISSION FOR A MOTOR VEHICLE

BACKGROUND OF THE INVENTION

1. Field of the Invention

The invention relates to a transmission for a motor vehicle, in particular an automated shift transmission, with a plurality of selectable and deselectable gear stages for implementing gear changes. The selection and deselection of the gear stages can be achieved by coupling units, in particular by engageable and disengageable sliding collars. The coupling units can be activated by shift rails and by respective actuators provided for this purpose, wherein particular gear stages are assigned to particular shift rails. The invention furthermore relates to a method for controlling a transmission. A plurality of gear stages can be selected and/or deselected in the transmission in order to implement gear changes. The selection and deselection of the gear stages is achieved with the aid of coupling units, in particular with the aid of engageable and disengageable sliding collars. The coupling units are activated by shift rails and by respective actuators provided for this purpose, wherein particular gear stages are assigned to particular shift rails.

Transmissions and methods for controlling transmissions for motor vehicles, wherein the transmissions have a given number of shift rails, are known. In these conventional transmissions, the shift rails are arranged such that they are effective, in terms of their operation, between the respective coupling units and the respective actuators. In other words, a coupling unit, which is preferably embodied as an engageable and disengageable sliding collar and with the aid of which the respective gear stage can be selected or deselected within the transmission, is actuated, via the shift rail, with the aid of the respective actuator, wherein the shift rail is arranged to be moveable within the transmission. As a result, the respective gear stage is either selected or deselected. In the conventional transmissions, specific gear stages are assigned to specifically corresponding shift rails. In this case, the first and the second gear stage are assigned to a first shift rail, the third and the fourth gear stage are assigned to a second shift rail and the fifth and the six gear stage are assigned to a third shift rail. In other words, the respective sequential gear changes between the first and second, the third and fourth gear etc. can be implemented with the aid of the first, second and third shift rail respectively by in each case correspondingly activating or moving just one shift rail.

Published, Non-Prosecuted German Patent Application No. DE 199 12 817 A1 discloses a device and a method in which a plurality of coupling units are provided within the transmission in order to reduce shifting times during gear changes, wherein the coupling units are separated from one another. In other words, the separate coupling units provided within the transmission, which can each be activated individually by separate actuators, preferably by Bowden cables, implement the individual gear changes within the transmission in a relatively short time since, in the case of sequential gear changes for example, when changing from first to second gear for example, two actuators and two coupling units are in each case activated simultaneously in order to implement the corresponding gear change. As a result, the shifting times here are correspondingly reduced.

In the case of the conventional devices and methods, i.e. in the case of the conventional transmissions, their control equipment is very complex and is therefore not only fault-prone but requires a correspondingly large amount of space when constructing the transmission in order to be able to implement the latter in an appropriate manner. Either, the control equipment for reducing the shifting times in conventional transmissions is very expensive and also fault-prone, such that it is impossible in this case to construct the transmissions in a compact way, or, the conventional transmissions can be constructed in a compact way and without complex control equipment but then have relatively long shifting times in the case of a gear change involving gear stages that are provided sequentially one after another.

SUMMARY OF THE INVENTION

It is accordingly an object of the invention to provide a transmission which overcomes the above-mentioned disadvantages of the heretofore-known transmissions of this general type and which reduces the shifting times for a gear change without the need for costly, fault-prone control equipment and which, at the same time, allows a compact construction of the transmission.

With the foregoing and other objects in view there is provided, in accordance with the invention, a transmission for a motor vehicle, including:

shift rails;

gear stages assigned to the shift rails such that respective successive ones of the gear stages are assigned to respective different ones of the shift rails;

the shift rails being configured such that, in a sequential gear change, respective ones of the shift rails are activated at least partially simultaneously;

coupling units operatively connected to respective ones of the shift rails and configured to select and deselect the gear stages for performing gear changes;

actuators operatively connected to respective ones of the shift rails; and the coupling units being configured to be activated via respective ones of the shift rails and respective ones of the actuators.

In other words, the object of the invention is achieved, by a transmission for a motor vehicle, in particular an automated shift transmission, with a plurality of selectable and deselectable gear stages for implementing gear changes, the selection and deselection of the gear stages being achievable with the aid of coupling units, in particular with the aid of engageable and disengageable sliding collars, the coupling units being activatable by shift rails and by respective actuators, and particular gear stages being assigned to particular shift rails, wherein a plurality of gear stages is assigned to at least two different shift rails in such a way that the respective successive gear stages are assigned to different shift rails, with the result that the respective shift rails can be activated at least partially simultaneously in the case of a sequential gear change.

According to another feature of the invention, a first one of the shift rails has a first and a third one of the gear stages assigned thereto; and the first one of the shift rails is activated by a first one of the actuators.

According to yet another feature of the invention, a second one of the shift rails has a second and a fourth one of the gear stages assigned thereto; and the second one of the shift rails is activated by a second one of the actuators.

According to a further feature of the invention, a third one of the shift rails has a fifth one of the gear stages assigned thereto; and the third one of the shift rails is activated by a third one of the actuators.

According to yet a further feature of the invention, the third one of the shift rails further has a seventh one of the gear stages assigned thereto; and a fourth one of the shift rails has a sixth and an eighth one of the gear stages assigned thereto.

According to another feature of the invention, the shift rails, the coupling units and the actuators form a motor vehicle transmission configuration.

According to yet another feature of the invention, the shift rails, the coupling units and the actuators form an automated shift transmission configuration.

According to another feature of the invention, the coupling units are sliding collars configured to be engageable and disengageable.

With the objects of the invention in view there is further provided, a transmission configuration, including:
  a first shift rail and a second shift rail;
  a first gear stage, a second gear stage as a subsequent gear stage to the first gear stage, a third gear stage as a subsequent gear stage to the second gear stage, and a fourth gear stage as a subsequent gear stage to the third gear stage;
  the first shift rail controlling the first gear stage and the third gear stage;
  the second shift rail controlling the second gear stage and the fourth gear stage; and
  the first shift rail and the second shift rail being simultaneously activated in case of a sequential gear change.

With the objects of the invention in view there is also provided, a method for controlling a transmission for a motor vehicle, the method includes the steps of:
  providing gear stages assigned to at least two shift rails such that respective successive ones of the gear stages are assigned to respective different ones of the shift rails; and
  performing gear changes by using coupling units activated via respective shift rails and respective actuators for selecting and deselecting the gear stages in the transmission and, in case of performing a sequential gear change, activating respective ones of the shift rails at least partially simultaneously in order to perform the sequential gear change.

In other words, the abovementioned object is achieved by a method for controlling a transmission for a motor vehicle, in particular a transmission as defined above, wherein a plurality of gear stages are selected and/or deselected in the transmission to implement gear changes, the selection and deselection of the gear stages being achieved with the aid of coupling units, in particular with the aid of engageable and disengageable sliding collars, the coupling units being activated by shift rails and by respective actuators, and particular gear stages being assigned to particular shift rails, wherein a plurality of gear stages is assigned to at least two different shift rails in such a way that the respective successive gear stages are assigned to different shift rails, with the result that the respective shift rails are activated at least partially simultaneously in the case of a sequential gear change.

Another mode of the method according to the invention includes the steps of activating a first shift rail by using a first actuator; and respectively selecting and deselecting a first gear stage and a third gear stage by using the first shift rail.

Yet another mode of the method according to the invention includes the steps of activating a second shift rail by using a second actuator; and respectively selecting and deselecting a second gear stage and a fourth gear stage by using the second shift rail.

Another mode of the method according to the invention includes the steps of activating a third shift rail by using a third actuator; and respectively selecting and deselecting a fifth gear stage and a seventh gear stage by using the third shift rail.

A further mode of the method according to the invention includes the steps of activating a fourth shift rail by using a fourth actuator; and respectively selecting and deselecting a sixth gear stage and an eighth gear stage by using the fourth shift rail.

Another mode of the method according to the invention includes the step of providing the coupling units as selectively engageable and disengageable sliding collars.

The invention is based fundamentally on the principle that, in a transmission with correspondingly provided shift rails, the respective gear stages are assigned to the various particular shift rails in a particular manner, namely in such a way that the gear stages that follow one another sequentially are provided on various, namely different, shift rails. This allows a partly simultaneous activation of the different shift rails on which the successive gear stages are provided and, due to the partially simultaneous activation of these different shift rails, the corresponding shifting time for the implementation of the gear change can be kept correspondingly short. As an advantageous result, short shifting times can thereby be achieved. Further, the number of shift rails in the transmission does not have to be increased and the control equipment does not have to be enhanced, in other words constructional outlay and corresponding costs are not increased, thereby avoiding the disadvantages mentioned at the outset.

There are many ways of refining and developing the transmission according to the invention and the method according to the invention in an advantageous manner.

Other features which are considered as characteristic for the invention are set forth in the appended claims.

Although the invention is illustrated and described herein as embodied in a transmission and a method for controlling a transmission for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a diagram illustrating a shift sequence according to the invention, in accordance with the shift rail principle illustrated in FIG. 3.

DESCRIPTION OF THE PREFERRED EMBODIMENTS

FIGS. 1 to 4 are schematic illustrations representing shift sequences within a transmission for a motor vehicle. The transmission has shift rails or shift rods, which are arranged in such a way that they can be moved essentially within the transmission. Furthermore, coupling units, which are known per se, are provided within the transmission in order to implement the corresponding gear changes. The coupling units are preferably embodied as engageable and disengageable sliding collars, which can be actuated with the aid of the shift rails. Each individual shift rail is activated by a corresponding actuator, i.e. the shift rail is moved or displaced appropriately. The actuators activating the shift rails can be implemented in various ways. Electrically embodied actuators and/or hydraulically embodied actuators can be used. The type of actuator which is to be used is dependent on the respective type of transmission and/or motor vehicle. The transmission is preferably embodied as an automated shift transmission or auto-shift gearbox but other forms of transmission, in particular automatic transmissions may also be used. The shift rail principle according to the invention, which is described here, is therefore not limited to an automated shift transmission such as an automated manual shift transmission.

Also provided are components for implementing the control scheme or control system. In particular, the control system has a control unit, which is implemented as an electronic and/or electrical device. Particularly in an automatic shift transmission, the control unit determines the speed of the motor vehicle, engine control parameters and the appropriate control parameters required to control the transmission sequences, i.e. the gear changes to be implemented in the transmission, for example. Via control lines that are provided, the control unit then activates the corresponding individual actuators to implement the gear changes or the selection and deselection of the respective gear stage. The basic principles of selecting or engaging a gear stage and deselecting or disengaging a gear stage are in principle known and therefore do not require any further detailed explanation.

Figure 1:
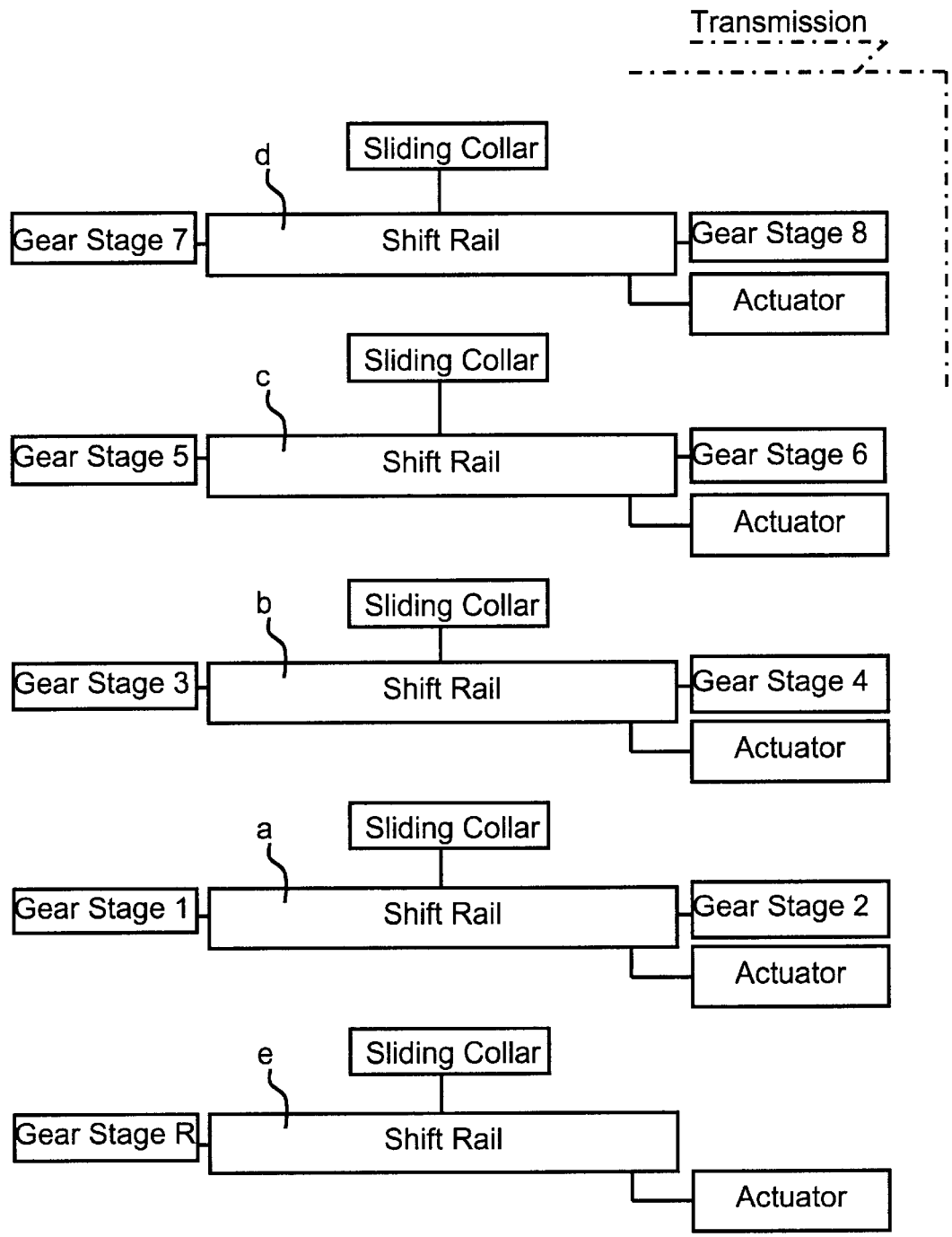
FIG. 1 is a schematic block diagram illustrating the shift rail principle according to the prior art.

The block diagram of FIG. 1 illustrates the conventional shift rail principle according to the prior art. Five shift rails a, b, c, d, and e are schematically illustrated as rectangular boxes. Each of the shift rails a, b, c, d, and e illustrated here is assigned a respective actuator, through the use of which the respective shift rail a, b, c, d, and e can be activated or moved in an appropriate manner. Each shift rail a, b, c, d, and e is furthermore operatively connected in an appropriate manner within the transmission to a corresponding coupling unit. The coupling unit is preferably an engageable and disengageable sliding collar which is only schematically illustrated in FIG. 1. A crucial aspect is that, in the prior art, as illustrated by FIG. 1, the first gear stage 1 and the second gear stage 2 are assigned to the first shift rail a, the third gear stage 3 and the fourth gear stage 4 are assigned to the second shift rail b, the fifth gear stage 5 is assigned to the third shift rail c, and the reverse gear R is also assigned to the fifth shift rail e.

Figure 2:
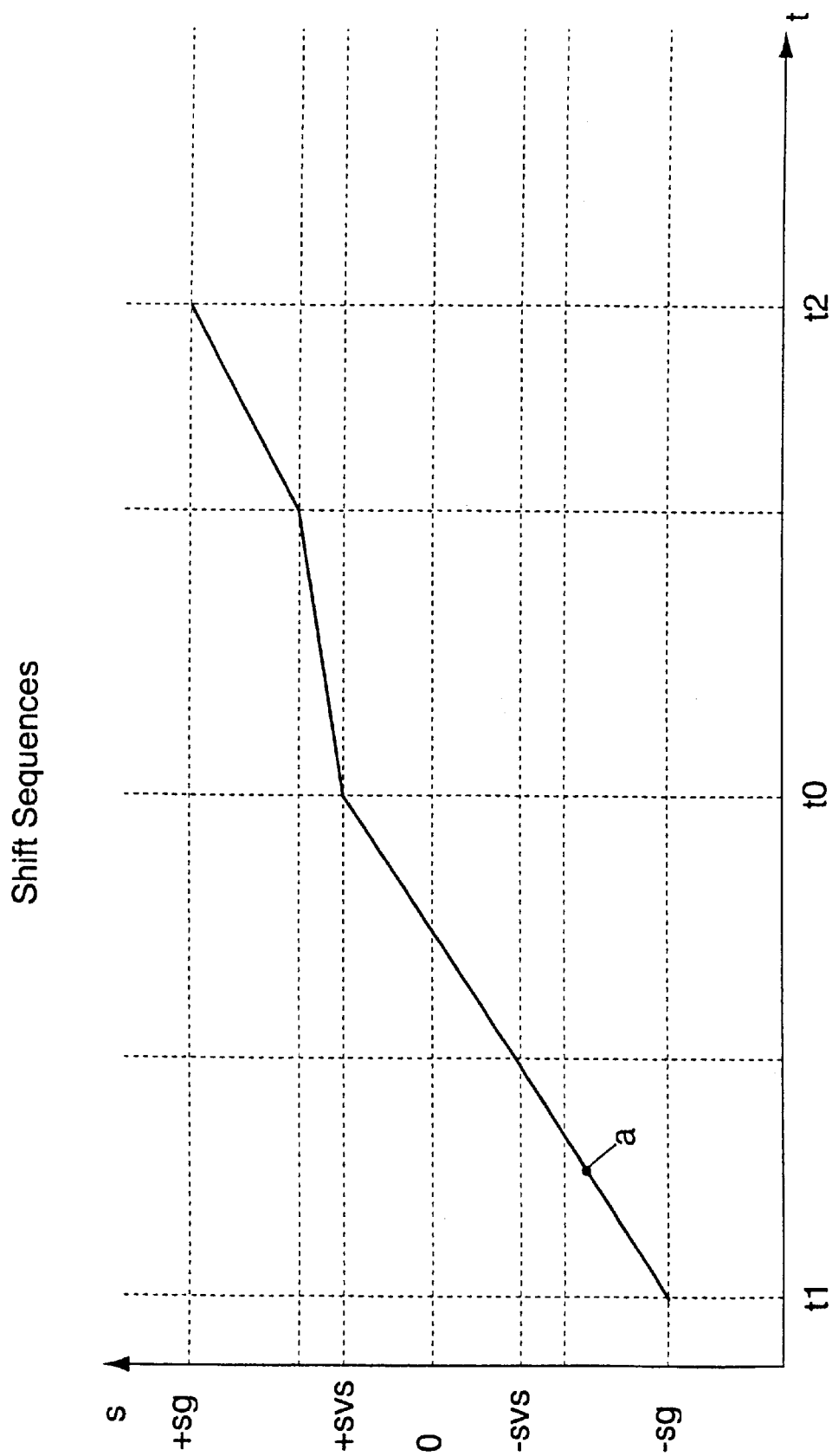
FIG. 2 is a diagram illustrating a shift sequence according to the prior art, in accordance with the shift rail principle illustrated in FIG. 1.

The shift sequence for the configuration or assignment of the shift rails and gear stages in accordance with FIG. 1, will be explained in greater detail below with reference to FIG. 2 which shows in a diagrammatic manner a position s versus time t. In the case of a gear change from the first gear stage 1 to the second gear stage 2, the shift rail a performs the following motion in accordance with the diagram illustrated in FIG. 2. First of all, the first gear stage 1 is deselected i.e. disengaged. The movement of the shift rail a starts at time t1 corresponding to a position −sg. The shift rail a now moves into its neutral position, i.e. traverses the latter until time t0 corresponding to a movement from −sg to +svs via −svs and "0" on the s-axis, at which time a presynchronization of the second gear stage 2 begins. Only when the second gear stage 2 has been appropriately synchronized is the second gear stage 2 selected, i.e. engaged. A corresponding shifting time ts between times t1 and t2 is obtained from the diagram illustrated in FIG. 2, and consequently the shifting time ts=(t2−t1) corresponding to a movement from −sg to +sg on the s-axis.

Figure 3:
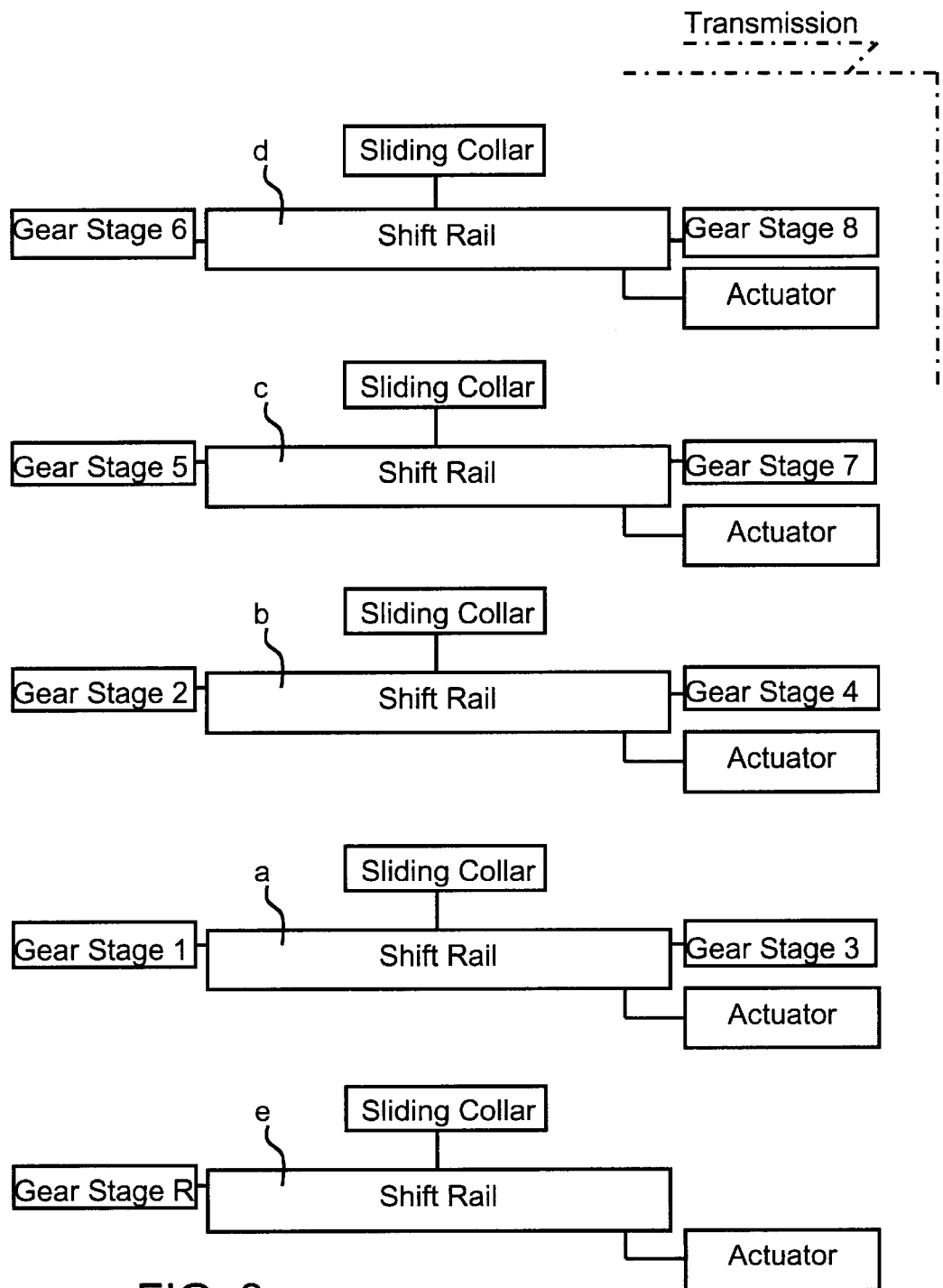
FIG. 3 is a schematic block diagram illustrating the shift rail principle according to the invention.

The disadvantages of the prior art shift rail configuration are avoided by the shift rail principle according to the invention, which is illustrated in FIG. 3. The fundamental principle is that a plurality of gear stages is assigned to at least two different shift rails in such a way that respective successive ones of the gear stages are assigned to different shift rails. As a result, the respective shift rails can be activated at least in part simultaneously in the case of a sequential gear change. However, it is not necessary that all forward gear stages that follow one another sequentially are assigned to different shift rails. It is, for example, also possible that only some gear stages, e.g. only the first four gear stages, are correspondingly assigned to the different shift rails.

As can now be seen from FIG. 3, five shift rails a, b, c, d, and e are likewise provided here, as in FIG. 1. However, the gear stages 1 to 8 and the gear stage R are assigned to the shift rails a, b, c, d, and e in a way different from the prior art. According to the invention, the first gear stage 1 and the third gear stage 3 are assigned to the first shift rail a, the second gear stage 2 and the fourth gear stage 4 are assigned to the second shift rail b, and the fifth gear stage 5 and the seventh gear stage 7 are assigned to the third shift rail c. The illustrations in FIGS. 1 and 3 show a total of eight gear stages here. According to FIG. 3, the fourth shift rail d is assigned to the sixth gear stage 6 and to the eighth gear stage 8. In contrast to that, the configuration in accordance with FIG. 1 has the seventh gear stage 7 and the eighth gear stage 8 assigned to the fourth shift rail d.

As FIG. 3 furthermore shows, the reverse gear R alone is assigned to the fifth shift rail e. As a result, at least a number of the forward gear stages can in each case always be arranged on or assigned to the different shift rails a to e, with the result that it is always possible for the respective different shift rails to be activated at least partially simultaneously in the case of a sequential gear change, in this case from gear stage 1 to gear stage 2 or from gear stage 2 to gear stage 3 or also from gear stage 4 to gear stage 5 etc. This reduces the shifting times for gear changes by virtue of the fact that the individual phases or stages of motion of the different shift rails can overlap, thus shortening the total shifting time. As a result, the phase in which the tractive force is interrupted during the shift operation is likewise shortened. The reduced interruption of the tractive force during shifts improves the shifting comfort in the case of power shifts. It is noted that the simultaneous motion of the different shift rails is achieved on the basis of the individually activatable actuators assigned to the shift rails, that is to say that the shift rails are not activated by a central gear shift shaft, as is customary in the prior art. It is therefore necessary to ensure mechanically and/or electronically that when two different shift rails are in motion (e.g. shift rails a and b), it is not also possible for two gears to be selected, i.e. engaged, at the same time since, otherwise, the transmission could be destroyed. A simultaneous synchronization phase of both gear stages should likewise be avoided since, in case of a simultaneous synchronization of both gear stages, there would be increased wear on the synchronizing devices.

FIG. 4 now shows the shift sequence of the shift rail configuration according to the invention shown in FIG. 3. During a shift between two gear stages, i.e. a gear change with different shift rails, parts of the motion of the shift rails can be performed in parallel, i.e. at the same time. According to the diagram illustrated in FIG. 4, a gear change from gear stage 1 to gear stage 2, for example, is illustrated here. During this process, the first gear stage 1 is deselected first, i.e. the first shift rail a is moved in an appropriate manner, the motion beginning at time t1 corresponding to a shift travel −sg on the s-axis. At a certain time, the second shift rail b is moved in parallel, i.e simultaneously with the shift rail a, to the start of presynchronization, the first shift rail a stopping at the neutral position "0" on the s-axis. In parallel with this, the second gear stage 2 is correspondingly synchronized, and the second gear stage 2 is selected at time t2new. The shifting time for this shift sequence, which is implemented in accordance with the method according to the invention with the aid of the transmission according to the invention, now amounts to the period of time between times t2new and t1. Compared with FIG. 2, it can therefore be stated that the new shifting time ts=(t2new−t1), where (t2new−t1)<(t2−t1). A saving in shifting time of dt is therefore obtained, as is illustrated in FIG. 4.

Fundamentally, the invention is therefore based on the principle that shifting motions of different shift rails are made possible in parallel, i.e. can occur at the same time, for sequential gear changes. This is achieved, in particular, by changing the respective gear assignments, i.e. assignments of the gear stages to the individual shift rails. In the configuration as illustrated in FIG. 3, all sequential gear changes, i.e. the gear changes from R to the first gear stage 1, from the first gear stage 1 to the second gear stage 2, from the second gear stage 2 to the third gear stage 3, from the third gear stage 3 to the fourth gear stage 4 etc. can take place with the sequences of motion of the different shift rails a to e made in a parallel manner. Fundamentally, it is not possible for the motions of the individual shift rails a to e to be made in a parallel manner in the configuration illustrated in FIG. 3 if, for example, one gear stage is to be omitted, in other words one gear stage is to be skipped. In general, a parallel motion for shift rails in the case when a gear is skipped, does not seem to be absolutely necessary since such a shift generally does not or at least not always take place under full load and hence can also take up more time, without having adverse effects for example on the shifting comfort. However, it is also possible to implement corresponding partially simultaneous "motion components" of different shift rails for the above-mentioned type of shifting which involves skipping a corresponding gear stage. This can be implemented by an appropriate change in the gear stage assignment.

Finally, it is possible that shifts, i.e. gear changes, which cannot take place in parallel, even with a modified gear assignment, can be made quicker if the functionless region around the neutral position is reduced. This has the effect that the distance traveled is shorter and is traversed correspondingly more quickly given the same speed. At the same time, however, care should be taken to ensure that there is a sufficiently large range of motion remaining between the presynchronization positions, which also ensures reliable deactivation of the corresponding gear stages.

We claim:

1. A transmission for a motor vehicle, comprising:

shift rails;

gear stages assigned to said shift rails such that respective successive ones of said gear stages are assigned to respective different ones of said shift rails;

said shift rails being configured such that, in a sequential gear change, respective ones of said shift rails are activated at least partially simultaneously;

coupling units operatively connected to respective ones of said shift rails and configured to select and deselect said gear stages for performing gear changes;

actuators operatively connected to respective ones of said shift rails; and said coupling units being configured to be activated via respective ones of said shift rails and respective ones of said actuators.

2. The transmission according to claim 1, wherein:

a first one of said shift rails has a first and a third one of said gear stages assigned thereto; and said first one of said shift rails is activated by a first one of said actuators.

3. The transmission according to claim 2, wherein:

a second one of said shift rails has a second and a fourth one of said gear stages assigned thereto; and said second one of said shift rails is activated by a second one of said actuators.

4. The transmission according to claim 3, wherein:

a third one of said shift rails has a fifth one of said gear stages assigned thereto; and said third one of said shift rails is activated by a third one of said actuators.

5. The transmission according to claim 4, wherein:

said third one of said shift rails further has a seventh one of said gear stages assigned thereto; and a fourth one of said shift rails has a sixth and an eighth one of said gear stages assigned thereto.

6. The transmission according to claim 1, wherein said shift rails, said coupling units and said actuators form a motor vehicle transmission configuration.

7. The transmission according to claim 1, wherein said shift rails, said coupling units and said actuators form an automated shift transmission configuration.

8. The transmission according to claim 1, wherein said coupling units are sliding collars configured to be engageable and disengageable.

9. A transmission configuration, comprising:

a first shift rail and a second shift rail;

a first gear stage, a second gear stage as a subsequent gear stage to said first gear stage, a third gear stage as a subsequent gear stage to said second gear stage, and a fourth gear stage as a subsequent gear stage to said third gear stage;

said first shift rail controlling said first gear stage and said third gear stage;

said second shift rail controlling said second gear stage and said fourth gear stage; and said first shift rail and said second shift rail being simultaneously activated in case of a sequential gear change.

10. A method for controlling a transmission for a motor vehicle, the method which comprises:

providing gear stages assigned to at least two shift rails such that respective successive ones of the gear stages are assigned to respective different ones of the shift rails; and performing gear changes by using coupling units activated via respective shift rails and respective actuators for selecting and deselecting the gear stages in the transmission and, in case of performing a sequential gear change, activating respective ones of the shift rails at least partially simultaneously in order to perform the sequential gear change.

11. The method according to claim 10, which comprises:
activating a first shift rail by using a first actuator; and
respectively selecting and deselecting a first gear stage and a third gear stage by using the first shift rail.

12. The method according to claim 11, which comprises:
activating a second shift rail by using a second actuator; and
respectively selecting and deselecting a second gear stage and a fourth gear stage by using the second shift rail.

13. The method according to claim 12, which comprises:
activating a third shift rail by using a third actuator; and respectively selecting and deselecting a fifth gear stage and a seventh gear stage by using the third shift rail.

14. The method according to claim 13, which comprises:
activating a fourth shift rail by using a fourth actuator; and
respectively selecting and deselecting a sixth gear stage and an eighth gear stage by using the fourth shift rail.

15. The method according to claim 10, which comprises providing the coupling units as selectively engageable and disengageable sliding collars.

* * * * *